United States Patent
Zhang et al.

(10) Patent No.: US 12,092,080 B2
(45) Date of Patent: *Sep. 17, 2024

(54) WIND TURBINE GENERATOR SYSTEM, AND ROTATION SPEED AVOIDANCE CONTROL METHOD AND APPARATUS THEREFOR

(71) Applicant: BEIJING GOLDWIND SCIENCE & CREATION WINDPOWER EQUIPMENT CO., LTD., Beijing (CN)

(72) Inventors: Xinli Zhang, Beijing (CN); Ye Hu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/997,379

(22) PCT Filed: Mar. 30, 2021

(86) PCT No.: PCT/CN2021/083977
§ 371 (c)(1),
(2) Date: Oct. 28, 2022

(87) PCT Pub. No.: WO2022/001248
PCT Pub. Date: Jan. 6, 2022

(65) Prior Publication Data
US 2023/0213018 A1    Jul. 6, 2023

(30) Foreign Application Priority Data
Jun. 28, 2020  (CN) .......................... 202010597154.9

(51) Int. Cl.
F03D 7/02    (2006.01)

(52) U.S. Cl.
CPC ......... *F03D 7/0276* (2013.01); *F03D 7/0296* (2013.01); *F03D 7/0272* (2013.01);
(Continued)

(58) Field of Classification Search
None
See application file for complete search history.

(56) References Cited

U.S. PATENT DOCUMENTS 11,692,526 B2 *   7/2023   Zhang .................. F03D 7/0272
290/44

FOREIGN PATENT DOCUMENTS

| CN | 103147916 A | 6/2013 |
|---|---|---|
| CN | 103758698 A | 4/2014 |

(Continued)

OTHER PUBLICATIONS

Machine translation of DE-102018102863-A1; year 2019.*
(Continued)

*Primary Examiner* — Juan G Flores

(57) ABSTRACT

A wind turbine generator system and a rotation speed avoidance control method therefor. The method comprises: according to statistical information of the rotation speed of a generator being in a rotation speed avoidance interval, identifying whether a wind turbine generator system repeatedly falls within the rotation speed avoidance interval; and when it is determined that the wind turbine generator system repeatedly falls within the rotation speed avoidance interval, adjusting a rotation speed avoidance control parameter of the wind turbine generator system according to the statistical information of the rotation speed being in the rotation speed avoidance interval. Correspondingly, further provided is a rotation speed avoidance control apparatus for a wind turbine generator system.

20 Claims, 4 Drawing Sheets

(52) U.S. Cl.
CPC ........ *F03D 7/0298* (2023.08); *F05B 2260/96* (2013.01); *F05B 2270/327* (2013.01)

(56) References Cited

FOREIGN PATENT DOCUMENTS

| | | | |
|---|---|---|---|
| CN | 103762919 A | * | 4/2014 |
| CN | 104405581 A | | 3/2015 |
| CN | 107514337 A | | 12/2017 |
| DE | 102018102863 A1 | * 8/2019 | ........... F03D 7/0276 |
| WO | 2012/139584 A1 | | 10/2012 |
| WO | WO-2017211367 A1 | * | 12/2017 |
| WO | 2019/086092 A1 | | 5/2019 |
| WO | 2019/154969 A1 | | 8/2019 |

OTHER PUBLICATIONS

Machine translation of CN-103762919-A; year 2014.*
The International Search Report mailed Jul. 12, 2021; PCT/CN2021/083977.
The Extended European Search Report dated Aug. 23, 2023; Appln. No. 201833226.0.

* cited by examiner

WIND TURBINE GENERATOR SYSTEM, AND ROTATION SPEED AVOIDANCE CONTROL METHOD AND APPARATUS THEREFOR

The present application is the national phase of International Patent Application No. PCT/CN2021/083977, titled "WIND TURBINE GENERATOR SYSTEM, AND ROTATION SPEED AVOIDANCE CONTROL METHOD AND APPARATUS THEREFOR", filed on Mar. 30, 2021, which claims priority to Chinese Patent Application No. 202010597154.9, filed on Jun. 28, 2020 with the Chinese Patent Office, both of which are incorporated herein by reference in their entireties.

FIELD

The present application generally relates to the field of wind power generation, and in particular, to a wind turbine, and a method and apparatus for controlling rotational speed avoidance for a wind turbine.

BACKGROUND

As the capacity of wind turbines increases, wind turbines equipped with a high-flexible tower have gradually become a trend due to high power generation performance, low costs and other characteristics. However, due to a low inherent frequency of the high-flexible tower itself, a frequency doubled component in an operating rotational speed of the wind turbine overlaps with the inherent frequency of the high-flexible tower. In a conventional design, in order to avoid resonance between a wind turbine at a minimum rotational speed and the tower with a first-order frequency, a value of a minimum rotational speed of a rotor of a generator is limited. This type of manner for controlling the rotational speed is referred as control for rotational speed avoidance. However, since a rated rotational speed of some wind turbines with a large impeller is very low at present, meeting the above limitation on the minimum rotational speed leads to a too narrow range between the minimum rotational speed and the rated rotational speed, resulting in a problem of poor power generation performance of the wind turbines. In order to solve the problem, the resonance with the tower may be avoided by increasing a rotational speed avoidance range while a relatively small minimum rotational speed is set. The rotational speed avoidance range represents a rotational speed range of the rotor of the generator to which a manner for controlling the rotational speed avoidance is adoptable.

However, if the rotational speed of the wind turbines is often in or frequently falls into the rotational speed avoidance range, the resonance of the wind turbines, increased loads or other safety issues arise.

SUMMARY

A wind turbine, and a method and apparatus for controlling rotational speed avoidance for a wind turbine are provided according to exemplary embodiments of the present disclosure, which can recognize the case that a rotational speed avoidance range is repeatedly passed through for the wind turbine, and avoid an abnormal situation in which the rotational speed avoidance range is repeatedly passed through for the wind turbine by adjusting parameters of rotational speed avoidance control function of the wind turbine.

A method for controlling rotational speed avoidance for a wind turbine is provided according to an exemplary embodiment of the present disclosure. The method includes: identifying whether a rotational speed avoidance range is repeatedly passed through for the wind turbine based on statistical information about a rotational speed of a generator being in the rotational speed avoidance range; and adjusting a rotational speed avoidance control parameter of the wind turbine based on the statistical information about the rotational speed being in the rotational speed avoidance range, in response to determining that the rotational speed avoidance range is repeatedly passed through for the wind turbine.

An apparatus for controlling rotational speed avoidance for a wind turbine is provided according to another exemplary embodiment of the present disclosure. The apparatus includes an abnormality identifying unit and an adjusting unit. The abnormality identifying unit is configured to identify whether a rotational speed avoidance range is repeatedly passed through for the wind turbine based on statistical information about a rotational speed of a generator being in the rotational speed avoidance range. The adjusting unit is configured to adjust a rotational speed avoidance control parameter of the wind turbine based on the statistical information about the rotational speed being in the rotational speed avoidance range, in response to determining that the rotational speed avoidance range is repeatedly passed through for the wind turbine.

A wind turbine is provided according to another exemplary embodiment of the present disclosure. The wind turbine includes a generator, a converter, a data collection module and a controller. The generator includes a stator and a rotor mechanically connected to an impeller; the converter is electrically coupled to a stator winding; the data collection module is configured to collect a rotational speed of the rotor of the generator; and the controller is configured to set an electromagnetic torque parameter of the converter to control the rotational speed of the generator, where the controller performs the foregoing method for controlling rotational speed avoidance.

A wind turbine is provided according to another exemplary embodiment of the present disclosure. The wind turbine includes a generator, a converter, a data collection module and a controller. The generator includes a stator and a rotor mechanically connected to an impeller; the converter is electrically coupled to a stator winding; the data collection module is configured to collect a rotational speed of the rotor of the generator; and the controller is configured to set an electromagnetic torque parameter of the converter to control the rotational speed of the generator, where the controller includes the foregoing apparatus for controlling rotational speed avoidance.

A computer-readable storage medium storing computer programs thereon is provided according to another exemplary embodiment of the present disclosure, where the computer programs, when being executed by a processor, perform the foregoing method for controlling rotational speed avoidance for a wind turbine.

With the wind turbine, the method and apparatus for controlling rotational speed avoidance for the wind turbine according to the exemplary embodiments of the present disclosure, it is enabled to recognize that a rotational speed avoidance range is repeatedly passed through for the rotational speed of the wind turbine, and by adjusting parameters of rotational speed avoidance control function of the wind turbine, avoid the abnormal resonance of the wind turbine, overloaded loads or the like, due to the rotational speed of the wind turbine frequently falling into or often being in the rotational speed avoidance range, thus ensuring the safety and reliability of the operation of the wind turbine.

Additional aspects and/or advantages of general concept of the present disclosure will be set forth partially in the following description, and partially will be apparent from the description, or may be learned by practice of the general concept of the present disclosure.

BRIEF DESCRIPTION OF THE DRAWINGS

The above and other objects and features of exemplary embodiments of the present disclosure will become more apparent from the following description taken in conjunction with the accompanying drawings that exemplarily illustrate embodiments, in which.

DETAILED DESCRIPTION OF THE EMBODIMENTS

Figure 1:
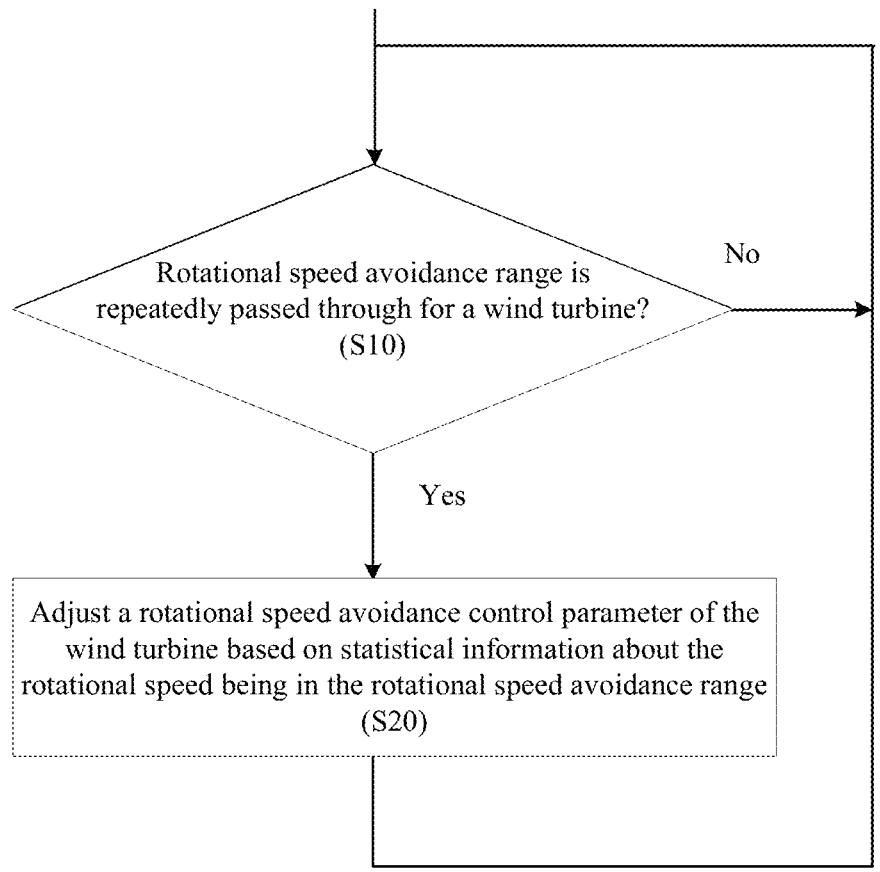
FIG. 1 illustrates a flowchart of a method for controlling rotational speed avoidance for a wind turbine according to an exemplary embodiment of the present disclosure.

Reference will now be made in detail to embodiments of the present disclosure, examples of which are illustrated in the accompanying drawings, in which like reference numerals refer to like parts throughout the description. The embodiments are described hereinafter in combination with the drawings in order to explain the present disclosure.

FIG. 1 illustrates a flowchart of a method for controlling rotational speed avoidance for a wind turbine according to an exemplary embodiment of the present disclosure. The method can be implemented by a computer program. As an example, the method may be performed offline or online. As an example, the method may be performed by a controller at a wind farm or a controller (e.g., a master controller) of the wind turbine.

Referring to FIG. 1, in step S10, it is identified whether a rotational speed avoidance range is repeatedly passed through for the wind turbine based on statistical information about a rotational speed of a generator being in the rotational speed avoidance range.

As an example, the rotational speed of the generator may be the rotational speed of a rotor of the generator.

As an example, the statistical information about the rotational speed of the rotor of the generator being in the rotational speed avoidance range may be statistical information that is usable to identify whether the rotational speed of the wind turbine is often in or frequently falls into the rotational speed avoidance range. As an example, the statistical information about the rotational speed of the generator being in the rotational speed avoidance range may include: a statistical duration in which the rotational speed of the generator is in the rotational speed avoidance range and/or a statistical number of times that the rotational speed falls into the rotational speed avoidance range.

As an example, the rotational speed avoidance of the wind turbine may refer to a condition in which the rotational speed of the generator falls into or is in the rotational speed avoidance range. As an example, in a case that the statistical information about the rotational speed of the generator being in the rotational speed avoidance range shows that the rotational speed is often in or frequently falls into the rotational speed avoidance range in a degree beyond a certain degree, it may be determined that the rotational speed avoidance range is repeatedly passed through for the wind turbine.

Control for rotational speed avoidance and/or passing through rotational speed avoidance is a control function/strategy for the rotational speed of a generator, and specifically refers to that, by controlling an electromagnetic torque of a converter of the wind turbine and the rotational speed of the generator, the wind turbine is enabled to quickly pass through a certain rotational speed range (i.e., rotational speed avoidance range) in a power generation process, to prevent the rotational speed from staying in the rotational speed range for a long time which causes resonance of the wind turbine, increased loads or other issues. That is, the rotational speed avoidance range mentioned in the present disclosure may be set by considering resonance, load reduction or other conditions, which is not limited in the present disclosure.

Figure 2:
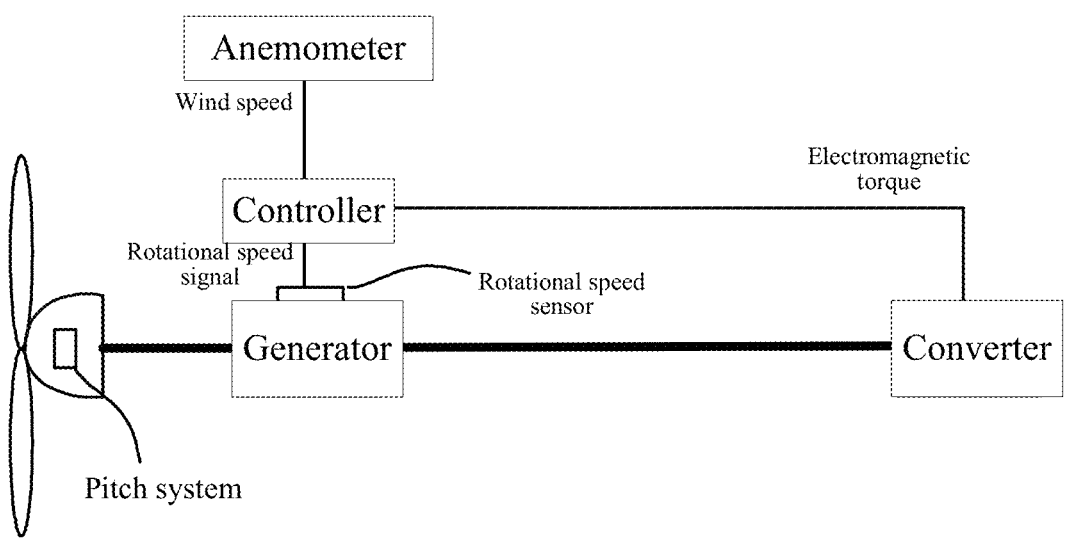
FIG. 2 illustrates a schematic structural diagram of a wind turbine according to an exemplary embodiment of the present disclosure.

Reference is made to FIG. 2, wind energy is captured by an impeller of the wind turbine, and an energy conversion unit is formed by the generator and the converter, and converts the wind energy into electrical energy and transmits the electrical energy to the grid. In the example of FIG. 2, the generator includes a stator and a rotor mechanically connected to the impeller. The converter is electrically coupled to a stator winding. In the example, the generator is a permanent magnet generator with magnet steel being provided in the rotor. The wind turbine is a direct-drive type wind turbine, the converter is a full-power converter, and the electric energy converted from the wind energy is all fed into the grid. A controller of the wind turbine collects the wind speed and a current rotational speed of the generator and transmits an electromagnetic torque control signal to the converter for controlling the current in the stator winding of the generator, to control the rotational speed of the rotor of the generator. It can be known from the aerodynamic torque formula $T_a = 0.5 \rho C_q \pi R^3 V^2$, an aerodynamic torque $T_a$ is direct proportional to a square of the wind speed V, where $\rho$ represents the air density of an external environment where the wind turbine is located, $C_q$ represents a torque coefficient of the wind turbine, and R represents the radius of the impeller. The wind turbine may control a pitch angle of each blade through a pitch system, to limit the energy of a wind flow absorbed by the impeller, and then adjust the aerodynamic torque. The generator may control an electromagnetic torque $T_e$ of the generator while performing the electrical energy conversion. As can be known from $\Delta T = T_a - T_e$ and $dw = \Delta T/J1$, a differential of the rotational speed of the generator is related to a difference between the aerodynamic torque $T_a$ and the electromagnetic torque $T_e$, where J1 represents moment of inertia, and w represents an angular velocity. To sum up, the entire wind turbine may adjust the aerodynamic torque $T_a$ and the electromagnetic torque $T_e$ through a pitch mechanism to control the rotational speed of the wind turbine.

Figure 3:
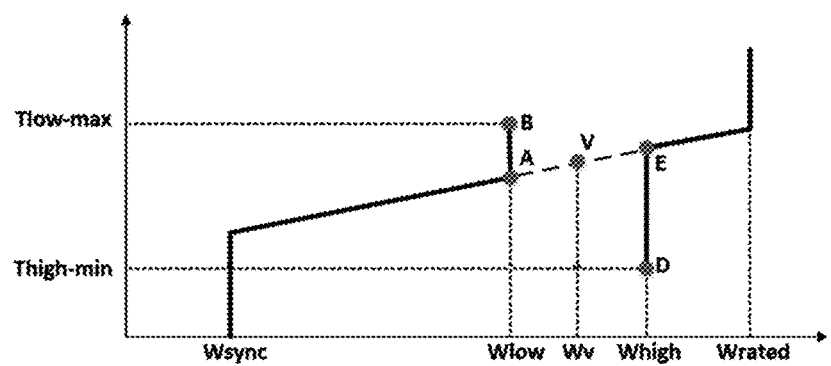
FIG. 3 illustrates a schematic diagram of controlling rotational speed avoidance according to an exemplary embodiment of the present disclosure.

FIG. 3 illustrates a rotational speed-electromagnetic torque operation curve of the generator, in which the ordinate represents the electromagnetic torque and the abscissa represents the rotational speed. In a case that the wind turbine operates normally, the rotational speed is between Wsync and Wrated, and (Wlow, Whigh) is the rotational speed avoidance range, Wlow is the lower boundary value of the rotational speed avoidance range, and Whigh is the upper boundary value of the rotational speed avoidance range, that is, the wind turbine cannot stay in the rotational speed range for a long time. Tlow-max and Thigh-min correspond to requirements for controlling the electromagnetic torque at the two rotational speeds of Wlow and Whigh respectively. Specifically, when the rotational speed reaches point A along with the wind speed, the rotational speed cannot continue to rise according to requirements for controlling rotational speed avoidance. In this case the rotational speed is controlled at Wlow. If the wind speed still increases, in order to maintain the rotational speed at Wlow, the electromagnetic torque increases continually until reaching Tlow-max (that is, reaching point B). After the electromagnetic torque stays at the point B for T1 seconds, the rotational speed is increased at a speed of V1 rad/s until the rotational speed reaches Whigh, that is, an operating state reaches point E. If the wind speed further increases, the rotational speed continues to increase upward. When the wind speed decreases at the point E, the rotational speed is unable to decrease according to the requirements for controlling rotational speed avoidance. The rotational speed is controlled at Whigh in this case. If the wind speed still decreases, in order to maintain the rotational speed at Whigh, the electromagnetic torque decreases continually until reaching Thigh–min (that is, reaching point D). After the electromagnetic torque stays at the point D for T2 seconds, the rotational speed is reduced at a speed of V2 rad/s to jump to the point A. Wlow and Whigh may be determined based on a design frequency (e.g., an inherent frequency of structural components including the tower) of the wind turbine. Parameters such as Tlow-max, Thigh-min, T1, T2, V1 and V2 are usually set by simulation and/or human experience, therefore, it is very easy to cause the rotational speed avoidance range (Wlow, Whigh) to be repeatedly passed through for the wind turbine due to ambient wind conditions and other reasons, which will affect the safety and life of the wind turbine.

Considering the accuracy of the control, a range may be reserved at both ends of the rotational speed avoidance range, and it is considered that the rotational speed being in the reserved range is a normal operation condition. As an example, the statistical information about the rotational speed of the generator being in the rotational speed avoidance range may include: the statistical duration in which the rotational speed of the generator is in a first predetermined range in the rotational speed avoidance range and/or the statistical number of times that the rotational speed falls into the first predetermined range. Here, the first predetermined range may be: (Wlow+We1, Whigh−We2).

As an example, the rotational speed of the generator may be equal to or may not be equal to the rotational speed of the impeller.

As an example, the step of identifying whether the rotational speed avoidance range is repeatedly passed through for the wind turbine based on the statistical duration in which the rotational speed of the generator is in the rotational speed avoidance range may include: determining, based on operation data in a historical operation period of the wind turbine, a proportion of a rotational speed avoidance duration corresponding to each of time intervals in the historical operation period, where the proportion of the rotational speed avoidance duration corresponding to each of time intervals is a proportion of a total duration, in which the rotational speed is in a first predetermined range in the rotational speed avoidance range within the time interval, to a predetermined duration; and determining that the rotational speed avoidance range is repeatedly passed through for the wind turbine, in a case that a total number of time intervals in which a proportion of the rotational speed avoidance duration exceeds a predetermined standard proportion in the historical operation period exceeds a first predetermined number, where, each of time intervals has a length of the predetermined duration.

As an example, the operation data in the historical operation period may be divided into M groups of operation data in an interval of the predetermined duration, where each group of operation data includes N rotational speeds of the generator collected at N consecutive sampling time points (that is, N rotational speeds are collected by collecting one rotational speed at each sampling time point). A ratio of the number of rotational speeds in the first predetermined range in the N rotational speeds of each group to N is determined as the proportion of the rotational speed avoidance duration corresponding to the corresponding time interval, where, M is an integer greater than 1, and N is an integer greater than 1. It should be understood that each group corresponds to a time interval, and different groups correspond to different time intervals.

As an example, the predetermined standard proportion may indicate that a proportion of the total duration in which the rotational speed is in the rotational speed avoidance range to the predetermined duration within the predetermined duration in a case of a normal rotational speed avoidance jump. Therefore, the proportion of the rotational speed avoidance duration corresponding to any one time interval exceeding the normal proportion indicates that the rotational speed avoidance in the time interval is abnormal.

As an example, the predetermined standard proportion may be determined based on at least one of the following: a jump-up duration (i.e., (Whigh−Wlow)/V1) required for the wind turbine to pass through the rotational speed avoidance range from a low rotational speed to a high rotational speed, a jump-down duration (i.e. (Whigh−Wlow)/V2) required to pass through the rotational speed avoidance range from a high rotational speed to a low rotational speed, a predetermined number of times that the rotational speed avoidance range can be normally passed through within the predetermined duration, and a length of the predetermined duration.

As an example, the predetermined standard proportion may be Ks: $T_{maxm}*I*J/L$, where, $T_{max}$ represents a maximum among the jump-up duration and the jump-down duration, I represents a margin coefficient, J represents the predetermined number of times that the rotational speed avoidance range can be normally passed through within the predetermined duration, and L represents the length of the predetermined duration.

Here, the number of times that the rotational speed avoidance range can be normally passed through within the predetermined duration may be determined based on at least one of actual operation conditions, simulation, and human experience. For example, in a case that the length of the predetermined duration is 20 minutes, the number of times that the rotational speed avoidance range can be normally passed through within the predetermined duration may be 10. In order that a certain margin is reserved when using the predetermined standard proportion for judgment and a certain degree of deviation is acceptable, a margin coefficient I is added. For example, I may be a value between 1.1 and 1.5. As an example, $T_{max}$ may be a value between 10 s and 30 s, for example, Wlow=7 rpm, Whigh=11 rpm, the set V1 is equal to V2, which is 0.2 rpm/s (that is, the requirement for controlling rotational speed avoidance is quickly passing through the rotational speed avoidance range at a speed of 0.2 rpm per second), the time for normal passing through/jumping one rotational speed avoidance range is T1=T2=(Whigh−Wlow)/V1=20 s. Assuming that a jump-up speed V1 is equal to a jump-down speed V2, the jump-up time (Whigh−Wlow)/V1 is equal to the jump-down time (Whigh−Wlow)/V2), $T_{max}$=20 s. For example, in a case that L=20 min, J=10, I=1.2, and $T_{max}$=20 s, the predetermined standard proportion is 0.2.

Figure 4:
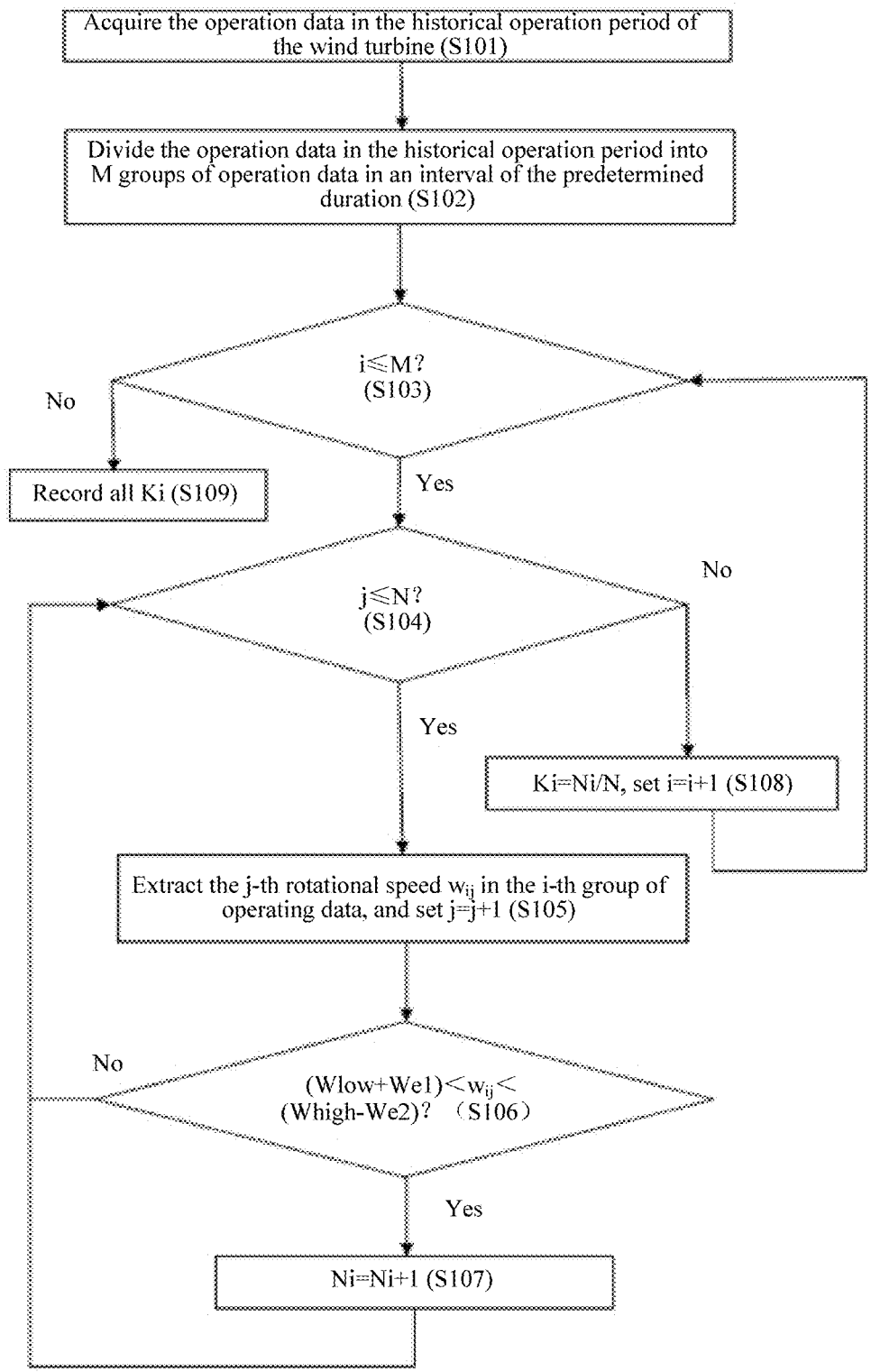
FIG. 4 illustrates a flowchart of a method for determining a proportion of a rotational speed avoidance duration corresponding to each of time intervals in a historical operation period according to an exemplary embodiment of the present disclosure.

FIG. 4 illustrates a flowchart of a method for determining a proportion of a rotational speed avoidance duration corresponding to each of time intervals in a historical operation period according to an exemplary embodiment of the present disclosure.

As shown in FIG. 4, in step S101, the operation data in the historical operation period of the wind turbine is acquired, where the operation data includes the rotational speed.

In step S102, the operation data in the historical operation period is divided into M groups of operation data in an interval of the predetermined duration. Specifically, the historical operation period is divided every predetermined duration, and the obtained operation data for each of time intervals forms a group of operation data. Each group of operation data includes N rotational speeds of the generator collected at N consecutive sampling time points (i.e., N operation points), and the N rotational speeds are sorted in an order of corresponding sampling time points. It should be understood that N depends on the length of the predetermined duration and a sampling period of operation data.

As an example, the historical operation period may be the latest month, and the predetermined duration may be a value ranging from 10 min to 30 min.

In step S103, it is identified whether i is less than or equal to M, where the initial value of i is 1.

In a case that it is determined in step S103 that i is less than or equal to M, step S104 is performed to identify whether j is less than or equal to N, where the initial value of j is 1.

In a case that it is determined in step S104 that j is less than or equal to N, step S105 is performed to extract the j-th rotational speed $w_{ij}$ in the i-th group of operation data, and set j=j+1.

After step S105, step S106 is performed to identify whether the extracted j-th rotational speed $w_{ij}$ in the i-th group of operation data is greater than (Wlow+We1) and less than (Whigh−We2).

In a case that it is determined in step S106 that $wi_{ij}$ is greater than (Wlow+We1) and less than (Whigh−We2), step S107 is performed to set Ni=Ni+1, and return to step S104, where the initial value of Ni is 0.

In a case that it is determined in step S106 that $w_{ij}$≤(Wlow+We1), or $w_{ij}$≥(Whigh−We2), the process returns to step S104.

In a case that it is determined in step S104 that j is greater than N, step S108 is performed to set Ki=Ni/N and i=i+1, and the process returns to step S103.

In a case that it is determined in step S103 that i is greater than M, step S109 is performed to record all Ki, that is, record K1, K2, K3, ..., KM. Here, each Ki is the proportion of the rotational speed avoidance duration corresponding to each of time intervals in the historical operation period.

Returning to FIG. 1, when it is determined in step S10 that the rotational speed avoidance range is repeatedly passed through for the wind turbine, step S20 is performed to adjust the rotational speed avoidance control parameter of the wind turbine based on the statistical information about the rotational speed being in the rotational speed avoidance range, to enable the wind turbine to perform the rotational speed avoidance control based on the adjusted rotational speed avoidance control parameter, thus avoiding that the rotational speed avoidance range is repeatedly passed through for the wind turbine as much as possible.

Figure 5:
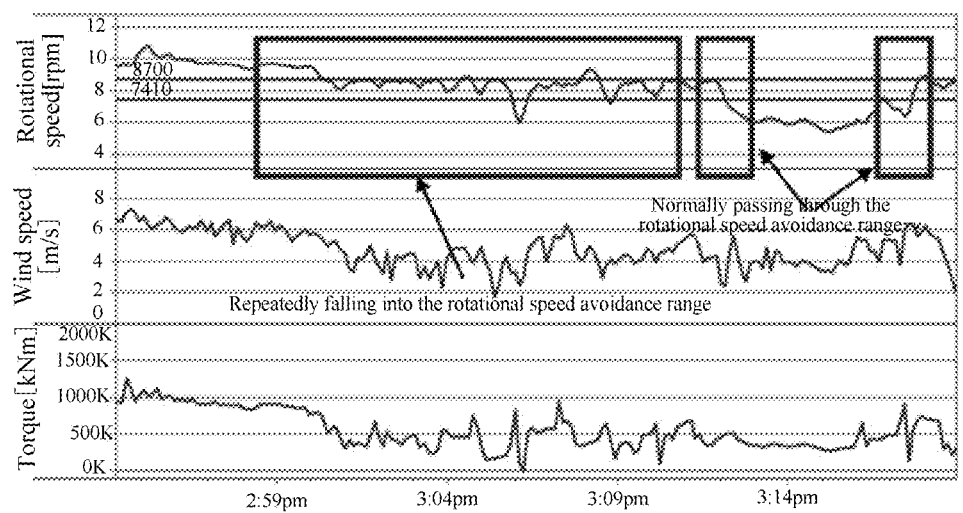
FIG. 5 illustrates an example in which a rotational speed of a wind turbine repeatedly falls into a rotational speed avoidance range according to an exemplary embodiment of the present disclosure.

The problem that the rotational speed avoidance range is repeatedly passed through for the wind turbine is considered in the present disclosure. As shown in FIG. 5, the rotational speed avoidance range is (7.410, 8.700). FIG. 5 shows a situation in which the rotational speed of the wind turbine repeatedly falls into the rotational speed avoidance range, which will result in abnormal resonance of the wind turbine, overloaded loads and other problems. When the wind speed increases, the wind turbine accumulates enough energy to rapidly increase the rotational speed of the generator to pass through the rotational speed avoidance range due to the effect of the change of wind. But when the wind speed decreases rapidly, the electromagnetic torque reaches an electromagnetic torque point corresponding to the upper boundary value (i.e., Whigh) of the rotational speed avoidance range, the rotational speed of the generator is rapidly decreased to pass through the rotational speed avoidance range. If the wind speed changes drastically, as shown in FIG. 5, the wind speed fluctuates repeatedly between 2 m/s and 6 m/s, which will cause the rotational speed of the generator to frequently going back and forth between the upper boundary value and the lower boundary value of the rotational speed avoidance range, it is known in the present disclosure by analysis that this situation is generally caused by severe changes in ambient wind conditions, a large turbulence, along with an unreasonably set rotational speed avoidance control parameter of the wind turbine.

In the conventional technology, the abnormal evaluation of repeatedly passing through the rotational speed avoidance range is still blank. The main reason lies in that due to the uncertainty of the above reasons, the abnormality is difficult to find during a prototype test, especially the ambient wind condition has great uncertainty. The abnormality of repeatedly passing through the rotational speed avoidance range often brings the following two problems: 1. the wind turbine is operating in the rotational speed avoidance range for a long time, and in a case that the vibration increases to a corresponding protection threshold, a shutdown failure occurs; 2. the wind turbine is operating in the rotational speed avoidance range for a long time or a short time, but the vibration does not reach the corresponding protection threshold, the impact (for example, a shutdown failure) may not appear in the short term, however, loss of power generation and loss of fatigue life of components occur after the long-term accumulation, resulting in the expense of loss of power generation and component damage, and it is difficult to find that the above problem is due to the abnormal rotational speed avoidance.

As an example, the adjusted rotational speed avoidance control parameter may include at least one of the following: waiting time for jump-up, waiting time for jump-down, a first electromagnetic torque, and a second electromagnetic torque, where the waiting time for jump-up is a period (i.e., T1) in which the rotational speed stays at a lower boundary value (i.e., Wlow) of the rotational speed avoidance range and an electromagnetic torque stays at the first electromagnetic torque (i.e., Tlow-max) before passing through the rotational speed avoidance range from a low rotational speed to a high rotational speed. The waiting time for jump-down is a period (i.e., T2) in which the rotational speed stays at an upper boundary value (i.e., Whigh) of the rotational speed avoidance range and the electromagnetic torque stays at the second electromagnetic torque (i.e., Thigh–min) before passing through the rotational speed avoidance range from a high rotational speed to a low rotational speed. It should be understood that the rotational speed avoidance range is an open interval.

As an example, the waiting time for jump-up and the waiting time for jump-down may be increased, and/or, the first electromagnetic torque may be increased and the second electromagnetic torque may be decreased, based on the statistical information about the rotational speed being in the rotational speed avoidance range, so as to accumulate more stable energy to enable the rotational speed to quickly jump through the rotational speed avoidance range, so as to shorten the period in which the wind turbine stays in the rotational speed avoidance range.

As an example, the rotational speed avoidance control parameter of the wind turbine may be adjusted based on a distribution of the proportions of the rotational speed avoidance duration corresponding to the time intervals in which a proportion of the rotational speed avoidance duration exceeds a predetermined standard proportion in the historical operation period. Specifically, the reason for the abnormal rotational speed avoidance may be determined based on the distribution of the abnormal proportions of the rotational speed avoidance duration (i.e., the proportion of the rotational speed avoidance duration exceeding the predetermined standard proportion). If it is determined that the abnormal rotational speed avoidance is caused due to the drastic changes in the ambient wind condition and large turbulence along with an unreasonably set rotational speed avoidance control parameter of the wind turbine based on the distribution of the abnormal proportions of the rotational speed avoidance duration, the rotational speed avoidance control parameter of the wind turbine may be adjusted accordingly.

As an example, the rotational speed avoidance control parameter of the wind turbine may be adjusted, in a case that the number of time intervals, corresponding to a predetermined wind speed range and in which a proportion of the rotational speed avoidance duration exceeds the predetermined standard proportion in the historical operation period, exceeds a second predetermined number, where the predetermined wind speed range is a wind speed range in the vicinity of a wind speed range corresponding to the rotational speed avoidance range. As an example, the wind speed range corresponding to the rotational speed avoidance range is a wind speed range in which the rotational speed falls into the rotational speed avoidance range. As an example, the wind speed range in the vicinity of the wind speed range corresponding to the rotational speed avoidance range may be a wind speed range including the wind speed range corresponding to the rotational speed avoidance range, the lower boundary value of the wind speed range is smaller than the lower boundary value of the wind speed range corresponding to the rotational speed avoidance range by a first predetermined value, and the upper boundary value of the wind speed range is greater than the upper boundary value of the wind speed range corresponding to the rotational speed avoidance range by a second predetermined value. The time interval corresponding to the predetermined wind speed range refers to a time interval in which an ambient wind speed of the wind turbine is in the predetermined wind speed range.

As an example, an adjustment amount of the rotational speed avoidance control parameter may be determined based on the distribution of the proportions of the rotational speed avoidance duration corresponding to the time intervals, corresponding to a predetermined wind speed range and in which a proportion of the rotational speed avoidance duration exceeds the predetermined standard proportion in the historical operation period, and the rotational speed avoidance control parameter may be adjusted based on the determined adjustment amount. It should be understood that the sum or difference between the current parameter value of the rotational speed avoidance control parameter and the determined adjustment amount is the adjusted parameter value. It should be understood that adjustment amounts determined for different rotational speed avoidance control parameters may be different or the same.

As an example, the greater the degrees and/or the greater the number of the proportions of the rotational speed avoidance duration corresponding to time intervals, corresponding to a predetermined wind speed range and in which a proportion of the rotational speed avoidance duration exceeds the predetermined standard proportion in the historical operation period, differring from the predetermined standard proportion, the greater the adjustment amount of the rotational speed avoidance control parameter is. In other words, the adjustment amount is positively correlated with the degrees of the proportions of the rotational speed avoidance duration satisfying a predetermined condition differing from the predetermined standard proportion and/or the number of proportions of the rotational speed avoidance duration differing from the predetermined standard proportion, where the predetermined condition is set as exceeding the predetermined standard proportion and the corresponding time interval corresponding to the predetermined wind speed range. In addition, the adjustment amount of the rotational speed avoidance control parameter may also be related to the ambient wind condition.

In one embodiment, the operation data used by the method according to the exemplary embodiment of the present disclosure may be the operation data of multiple wind turbines with the same model in the wind farm. The rotational speed avoidance control parameter of the multiple wind turbines with the same model may be adjusted uniformly by performing the method. Accordingly, the method may be performed by a controller at the wind farm.

In another embodiment, the operation data used by the method according to the exemplary embodiment of the present disclosure may be the operation data of a single wind turbine. The rotational speed avoidance control parameter of the wind turbine may be adjusted individually by performing the method. Correspondingly, the method may be performed by the controller at the wind farm or by the controller of the wind turbine.

Figure 6:
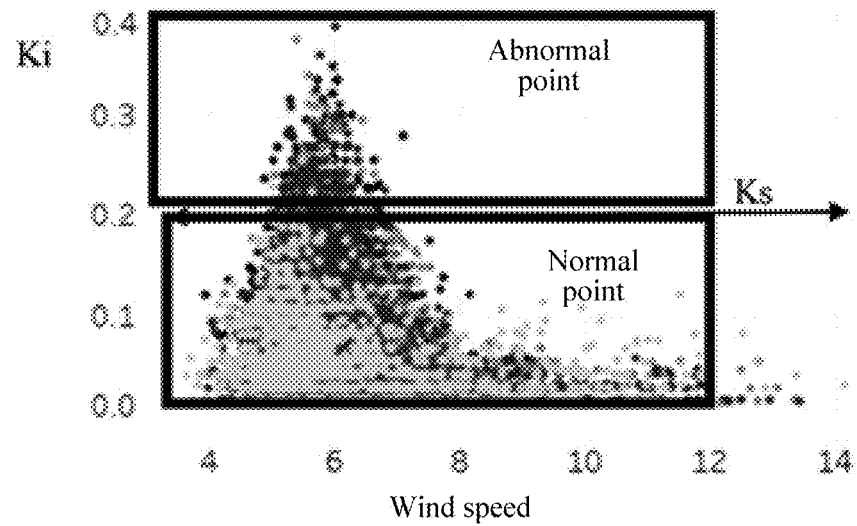
FIG. 6 illustrates a distribution diagram of a proportion of a rotational speed avoidance duration according to an exemplary embodiment of the present disclosure.

FIG. 6 illustrates the distribution of the proportions Ki of the rotational speed avoidance duration corresponding to different time intervals of all the wind turbines with the same model in the wind farm. The abscissa in FIG. 6 represents the wind speed, and the ordinate represents the value of Ki. The predetermined standard proportion Ks is set as 0.2, and each point represents the proportion of the rotational speed avoidance duration corresponding to one wind turbine in one time interval. Therefore, the point where the proportion of the rotational speed avoidance duration exceeds 0.2 is an abnormal point, otherwise is a normal point. It can be seen that the set of points in FIG. 6 has an apparent triangular structure, and the highest point is in the vicinity of the wind speed of 6 m/s, which corresponds to points of wind speed corresponding to the rotational speed avoidance range. The energy provided by the wind keeps the rotational speed between the upper boundary value and the lower boundary value of the rotational speed avoidance range, in other words, if the wind speed is relatively small, the rotational speed stays at the lower boundary value for a long time, and if the wind speed is relatively large, the rotational speed stays at the upper boundary value for a long time. If the wind speed is between the lower boundary value and the upper boundary value (for example, the wind speed is at 6 m/s) and a large turbulence occurs, a problem of repeatedly falling into the rotational speed avoidance range occurs. Therefore, it may be determined that the abnormal rotational speed avoidance of the wind turbine is caused by the improper setting of the rotational speed avoidance control parameter based on the distribution of the proportions of the rotational speed avoidance duration (that is, there are a large number of abnormal points for which a corresponding wind speed is in the vicinity (i.e., 5 m/s to 7 m/s) of the wind speed section corresponding to the rotational speed avoidance range, and these abnormal points are distributed in a triangular structure). Therefore, this situation may be improved by adjusting the rotational speed avoidance control parameter of the wind turbine, and the adjustment amount of the rotational speed avoidance control parameter may be further determined based on the distribution of abnormal points. For example, the greater the degrees and the greater the number of the abnormal points corresponding to the wind speed ranging from 5 m/s to 7 m/s away from Ks, the greater the adjustment amount of the rotational speed avoidance control parameter is.

According to the exemplary embodiments of the present disclosure, it is enabled to quickly and accurately assess whether there is an abnormality in the rotational speed avoidance for the wind turbine, and further adjust the rotational speed avoidance control parameter based on the cause of the abnormal rotational speed avoidance in combination with analysis and diagnosis of root causes, to jump out the abnormality and return to a normal operating state of the wind turbine, thus avoiding further vibration exceeding the limit and increased load.

Figure 7:
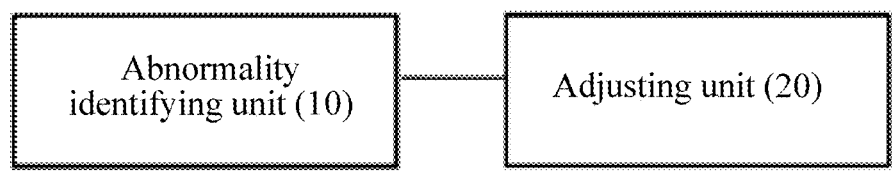
FIG. 7 illustrates a block diagram of an apparatus for controlling rotational speed avoidance for a wind turbine according to an exemplary embodiment of the present disclosure.

FIG. 7 illustrates a block diagram of an apparatus for controlling rotational speed avoidance for a wind turbine according to an exemplary embodiment of the present disclosure.

As shown in FIG. 7, the apparatus for controlling rotational speed avoidance includes an abnormality identifying unit 10 and an adjusting unit 20.

Specifically, the abnormality identifying unit 10 is configured to identify whether a rotational speed avoidance range is repeatedly passed through for the wind turbine based on statistical information about a rotational speed of a generator being in the rotational speed avoidance range.

The adjusting unit 20 is configured to adjust a rotational speed avoidance control parameter of the wind turbine based on the statistical information about the rotational speed being in the rotational speed avoidance range, in response to determining that the rotational speed avoidance range is repeatedly passed through for the wind turbine.

As an example, the statistical information about a rotational speed of a generator being in the rotational speed avoidance range may include: a statistical duration in which the rotational speed of the generator is in the rotational speed avoidance range and/or a statistical number of times that the rotational speed falls into the rotational speed avoidance range.

As an example, the abnormality identifying unit 10 may determine, based on operation data of the wind turbine in a historical operation period, a proportion of a rotational speed avoidance duration corresponding to each of time intervals in the historical operation period, and determine that the rotational speed avoidance range is repeatedly passed through for the wind turbine, in a case that a total number of time intervals in which a proportion of the rotational speed avoidance duration exceeds a predetermined standard proportion in the historical operation period exceeds a first predetermined number. The proportion of the rotational speed avoidance duration corresponding to each of time intervals is a proportion of a total duration, in which the rotational speed is in a first predetermined range in the rotational speed avoidance range within the time interval, to a predetermined duration. Each of time intervals has a length of the predetermined duration.

As an example, the abnormality identifying unit 10 may divide the operation data in the historical operation period into M groups of operation data in an interval of the predetermined duration, where each group of operation data includes N rotational speeds of the generator collected at N consecutive sampling time points; and determine a ratio of the number of rotational speeds in the first predetermined range in the N rotational speeds of each group to N as the proportion of the rotational speed avoidance duration corresponding to the corresponding time interval, where, M is an integer greater than 1, and N is an integer greater than 1.

As an example, the predetermined standard proportion may be determined based on at least one of the following: a jump-up duration required for the wind turbine to pass through the rotational speed avoidance range from a low rotational speed to a high rotational speed, a jump-down duration required to pass through the rotational speed avoidance range from a high rotational speed to a low rotational speed, a predetermined number of times that the rotational speed avoidance range can be normally passed through within the predetermined duration, and a length of the predetermined duration.

As an example, the predetermined standard proportion may be $T_{max}*I*J/L$, where, $T_{max}$ represents a maximum among the jump-up duration and the jump-down duration, I represents a margin coefficient, J represents the predetermined number of times that the rotational speed avoidance range can be normally passed through within the predetermined duration, and L represents the length of the predetermined duration.

As an example, the adjusted rotational speed avoidance control parameter may include at least one of the following: waiting time for jump-up, waiting time for jump-down, a first electromagnetic torque and a second electromagnetic torque, where, the waiting time for jump-up is a period in which the rotational speed stays at a lower boundary value of the rotational speed avoidance range and an electromagnetic torque stays at the first electromagnetic torque before passing through the rotational speed avoidance range from a low rotational speed to a high rotational speed, the waiting time for jump-down is a period in which the rotational speed stays at an upper boundary value of the rotational speed avoidance range and the electromagnetic torque stays at the second electromagnetic torque before passing through the rotational speed avoidance range from a high rotational speed to a low rotational speed, where the rotational speed avoidance range is an open interval.

As an example, the adjusting unit 20 may increase the waiting time for jump-up and the waiting time for jump-down, and/or, increase the first electromagnetic torque and decrease the second electromagnetic torque, based on the statistical information about the rotational speed being in the rotational speed avoidance range.

As an example, the adjusting unit 20 may adjust the rotational speed avoidance control parameter of the wind turbine based on a distribution of the proportions of the rotational speed avoidance duration corresponding to the time intervals in which a proportion of the rotational speed avoidance duration exceeds a predetermined standard proportion in the historical operation period.

As an example, the adjusting unit 20 may adjust the rotational speed avoidance control parameter of the wind turbine, in a case that the number of time intervals, corresponding to a predetermined wind speed range and in which a proportion of the rotational speed avoidance duration exceeds the predetermined standard proportion in the historical operation period, exceeds a second predetermined number, where the predetermined wind speed range is a wind speed range in the vicinity of a wind speed range corresponding to the rotational speed avoidance range.

As an example, the adjusting unit 20 may determine an adjustment amount of the rotational speed avoidance control parameter based on the distribution of the proportions of the rotational speed avoidance duration corresponding to the time intervals, corresponding to a predetermined wind speed range and in which a proportion of the rotational speed avoidance duration exceeds the predetermined standard proportion in the historical operation period, and adjust the rotational speed avoidance control parameter based on the determined adjustment amount, where the predetermined wind speed range is a wind speed range in the vicinity of a wind speed range corresponding to the rotational speed avoidance range.

As an example, the greater the degrees and/or the greater the number of the proportions of the rotational speed avoidance duration corresponding to time intervals, corresponding to a predetermined wind speed range and in which a proportion of the rotational speed avoidance duration exceeds the predetermined standard proportion in the historical operation period, differring from the predetermined standard proportion, the greater the adjustment amount of the rotational speed avoidance control parameter is.

It should be understood that specific processing performed by the apparatus for controlling rotational speed avoidance for the wind turbine according to the exemplary embodiment of the present disclosure has been described in detail with reference to FIGS. 1 to 6, and the relevant details will not be repeated here.

It should be understood that each of units in the apparatus for controlling rotational speed avoidance for a wind turbine according to the exemplary embodiment of the present disclosure may be implemented as hardware components and/or software components. Those skilled in the art may implement the various apparatus based on the defined processing to be performed by each apparatus by using a field programmable gate array (FPGA) or an application specific integrated circuit (ASIC), for example.

In addition, a wind turbine is provided according to an exemplary embodiment of the present disclosure. As shown in FIG. 2, the wind turbine includes a generator, a converter, a data collection module (not shown in the figure) and a controller. The generator includes a stator and a rotor mechanically connected to an impeller; the converter is electrically coupled to a stator winding; the data collection module is configured to collect a rotational speed of the rotor of the generator; and the controller is configured to set an electromagnetic torque parameter of the converter to control the current in the stator winding, thereby controlling the rotational speed of the rotor of the generator. The controller is configured to perform the method for controlling rotational speed avoidance for a wind turbine according to the foregoing exemplary embodiments. As an example, the data collection module may include a rotational speed sensor. In addition, the data collection module may further be configured to collect information such as electromagnetic torque and ambient wind speed of the wind turbine.

In addition, a wind turbine is further provided according to an exemplary embodiment of the present disclosure. As shown in FIG. 2, the wind turbine includes a generator, a converter, a data collection module (not shown in the figure) and a controller. The generator includes a stator and a rotor mechanically connected to an impeller; the converter is electrically coupled to a stator winding; the data collection module is configured to collect a rotational speed of the rotor of the generator; and the controller is configured to set an electromagnetic torque parameter of the converter to control the current in the stator winding, thereby controlling the rotational speed of the rotor of the generator. The controller includes the apparatus for controlling rotational speed avoidance for a wind turbine according to the forgoing exemplary embodiments.

A computer-readable storage medium storing computer programs thereon is provided according to an exemplary embodiment of the present disclosure. The computer programs, when being executed by a processor, implement the method for controlling rotational speed avoidance for a wind turbine according to the foregoing exemplary embodiments. The computer-readable storage medium is any data storage device that can store data read by a computer system. Examples of the computer-readable storage medium include a read-only memory, a random-access memory, read-only optical disks, magnetic tapes, floppy disks, optical data storage devices, and carrier waves (such as data transmission over the Internet via wired or wireless transmission paths).

Although some embodiments of the present disclosure are described hereinabove, those skilled in the art should appreciate that the embodiments may be modified without deviating from the principles and the spirit of the present disclosure which are limited by the claims and the equivalent thereof.

The invention claimed is:

1. A method for controlling rotational speed avoidance for a wind turbine, comprising:
   identifying whether a rotational speed avoidance range is repeatedly passed through for the wind turbine based on statistical information about a rotational speed of a generator being in the rotational speed avoidance range;
   adjusting a rotational speed avoidance control parameter of the wind turbine based on the statistical information about the rotational speed being in the rotational speed avoidance range, in response to determining that the rotational speed avoidance range is repeatedly passed through for the wind turbine; and
   setting an electromagnetic torque parameter of a converter in the wind turbine and controlling the rotational speed of the generator in the wind turbine, wherein the statistical information about the rotational speed of the generator being in the rotational speed avoidance range comprises: a statistical duration in which the rotational speed of the generator is in the rotational speed avoidance range.

2. The method according to claim 1, wherein the statistical information about the rotational speed of the generator being in the rotational speed avoidance range further comprises: a statistical number of times that the rotational speed falls into the rotational speed avoidance range.

3. The method according to claim 1, wherein the step of identifying whether the rotational speed avoidance range is repeatedly passed through for the wind turbine based on the statistical duration in which the rotational speed of the generator is in the rotational speed avoidance range comprises:
  determining, based on operation data of the wind turbine in a historical operation period, a proportion of a rotational speed avoidance duration corresponding to each of time intervals in the historical operation period, wherein the proportion of the rotational speed avoidance duration corresponding to each of time intervals is a proportion of a total duration, in which the rotational speed is in a first predetermined range in the rotational speed avoidance range within the time interval, to a predetermined duration; and
  determining that the rotational speed avoidance range is repeatedly passed through for the wind turbine, in a case that a total number of time intervals in which the proportion of the rotational speed avoidance duration exceeds a predetermined standard proportion in the historical operation period exceeds a first predetermined number,
  wherein, each of time intervals has a length of the predetermined duration.

4. The method according to claim 3, wherein the predetermined standard proportion is determined based on at least one of the following: a jump-up duration required for the wind turbine to pass through the rotational speed avoidance range from a low rotational speed to a high rotational speed, a jump-down duration required to pass through the rotational speed avoidance range from a high rotational speed to a low rotational speed, a predetermined number of times that the rotational speed avoidance range can be normally passed through within the predetermined duration, and a length of the predetermined duration.

5. The method according to claim 4, wherein the predetermined standard proportion is set as $T_{max}*I*J/L$,
  wherein, $T_{max}$ represents a maximum among the jump-up duration and the jump-down duration, I represents a margin coefficient, J represents the predetermined number of times that the rotational speed avoidance range can be normally passed through within the predetermined duration, and L represents the length of the predetermined duration.

6. The method according to claim 3, wherein, the step of adjusting the rotational speed avoidance control parameter of the wind turbine based on the statistical information about the rotational speed being in the rotational speed avoidance range comprises:
  adjusting the rotational speed avoidance control parameter of the wind turbine based on a distribution of the proportions of the rotational speed avoidance duration corresponding to the time intervals in which the proportion of the rotational speed avoidance duration exceeds the predetermined standard proportion in the historical operation period.

7. The method according to claim 6, wherein the step of adjusting the rotational speed avoidance control parameter of the wind turbine based on a distribution of the proportions of the rotational speed avoidance duration corresponding to the time intervals in which the proportion of the rotational speed avoidance duration exceeds the predetermined standard proportion in the historical operation period comprises:
  adjusting the rotational speed avoidance control parameter of the wind turbine, in a case that the number of time intervals, corresponding to a predetermined wind speed range and in which the proportion of the rotational speed avoidance duration exceeds the predetermined standard proportion in the historical operation period, exceeds a second predetermined number,
  wherein the predetermined wind speed range is a wind speed range in the vicinity of a wind speed range corresponding to the rotational speed avoidance range.

8. The method according to claim 6, wherein the step of adjusting the rotational speed avoidance control parameter of the wind turbine based on a distribution of the proportions of the rotational speed avoidance duration corresponding to the time intervals in which the proportion of the rotational speed avoidance duration exceeds the predetermined standard proportion in the historical operation period comprises:
  determining an adjustment amount of the rotational speed avoidance control parameter based on the distribution of the proportions of the rotational speed avoidance duration corresponding to the time intervals, corresponding to a predetermined wind speed range and in which the proportion of the rotational speed avoidance duration exceeds the predetermined standard proportion in the historical operation period, and adjusting the rotational speed avoidance control parameter based on the determined adjustment amount,
  wherein the predetermined wind speed range is a wind speed range in the vicinity of a wind speed range corresponding to the rotational speed avoidance range.

9. The method according to claim 8, wherein
  the greater degrees and/or the greater number of the proportions of the rotational speed avoidance duration corresponding to time intervals, corresponding to the predetermined wind speed range and in which the proportion of the rotational speed avoidance duration exceeds the predetermined standard proportion in the historical operation period, differing from the predetermined standard proportion, the greater the adjustment amount of the rotational speed avoidance control parameter is.

10. The method according to claim 1, wherein the adjusted rotational speed avoidance control parameter comprises at least one of the following: waiting time for jump-up, waiting time for jump-down, a first electromagnetic torque and a second electromagnetic torque,
  wherein, the waiting time for jump-up is a period in which the rotational speed stays at a lower boundary value of the rotational speed avoidance range and an electromagnetic torque stays at the first electromagnetic torque before passing through the rotational speed avoidance range from a low rotational speed to a high rotational speed,
  the waiting time for jump-down is a period in which the rotational speed stays at an upper boundary value of the rotational speed avoidance range and the electromagnetic torque stays at the second electromagnetic torque before passing through the rotational speed avoidance range from a high rotational speed to a low rotational speed, wherein the rotational speed avoidance range is an open interval.

11. The method according to claim 10, wherein the step of adjusting the rotational speed avoidance control parameter of the wind turbine based on the statistical information about the rotational speed being in the rotational speed avoidance range comprises:
increasing the waiting time for jump-up and the waiting time for jump-down, and/or, increasing the first electromagnetic torque and decreasing the second electromagnetic torque, based on the statistical information about the rotational speed being in the rotational speed avoidance range.

12. A wind turbine, comprising:
a generator, comprising a stator and a rotor mechanically connected to an impeller;
a converter, electrically coupled to a stator winding; and
a data collection module, configured to collect a rotational speed of the rotor of the generator; and
a controller, configured to set an electromagnetic torque parameter of the converter to control the rotational speed of the generator, wherein the controller performs:
identifying whether a rotational speed avoidance range is repeatedly passed through for the wind turbine based on statistical information about a rotational speed of the generator being in the rotational speed avoidance range; and
adjusting a rotational speed avoidance control parameter of the wind turbine based on the statistical information about the rotational speed being in the rotational speed avoidance range, in response to determining that the rotational speed avoidance range is repeatedly passed through for the wind turbine,
wherein the statistical information about the rotational speed of the generator being in the rotational speed avoidance range comprises:
a statistical duration in which the rotational speed of the generator is in the rotational speed avoidance range.

13. The wind turbine according to claim 12, wherein the generator is a permanent magnet generator, and the wind turbine is a direct-drive type wind turbine.

14. The wind turbine according to claim 12, wherein the statistical information about the rotational speed of the generator being in the rotational speed avoidance range further comprises:
a statistical number of times that the rotational speed falls into the rotational speed avoidance range.

15. The wind turbine according to claim 12, wherein identifying whether the rotational speed avoidance range is repeatedly passed through for the wind turbine based on the statistical duration in which the rotational speed of the generator is in the rotational speed avoidance range comprises:
determining, based on operation data of the wind turbine in a historical operation period, a proportion of a rotational speed avoidance duration corresponding to each of time intervals in the historical operation period, wherein the proportion of the rotational speed avoidance duration corresponding to each of time intervals is a proportion of a total duration, in which the rotational speed is in a first predetermined range in the rotational speed avoidance range within the time interval, to a predetermined duration; and
determining that the rotational speed avoidance range is repeatedly passed through for the wind turbine, in a case that a total number of time intervals in which the proportion of the rotational speed avoidance duration exceeds a predetermined standard proportion in the historical operation period exceeds a first predetermined number,
wherein, each of time intervals has a length of the predetermined duration.

16. The wind turbine according to claim 15, wherein the predetermined standard proportion is determined based on at least one of the following: a jump-up duration required for the wind turbine to pass through the rotational speed avoidance range from a low rotational speed to a high rotational speed, a jump-down duration required to pass through the rotational speed avoidance range from a high rotational speed to a low rotational speed, a predetermined number of times that the rotational speed avoidance range can be normally passed through within the predetermined duration, and a length of the predetermined duration.

17. The wind turbine according to claim 16, wherein the predetermined standard proportion is set as $T_{max}*I*J/L$,
wherein, $T_{max}$ represents a maximum among the jump-up duration and the jump-down duration, I represents a margin coefficient, J represents the predetermined number of times that the rotational speed avoidance range can be normally passed through within the predetermined duration, and L represents the length of the predetermined duration.

18. The wind turbine according to claim 12, wherein the adjusted rotational speed avoidance control parameter comprises at least one of the following: waiting time for jump-up, waiting time for jump-down, a first electromagnetic torque and a second electromagnetic torque,
wherein, the waiting time for jump-up is a period in which the rotational speed stays at a lower boundary value of the rotational speed avoidance range and an electromagnetic torque stays at the first electromagnetic torque before passing through the rotational speed avoidance range from a low rotational speed to a high rotational speed,
the waiting time for jump-down is a period in which the rotational speed stays at an upper boundary value of the rotational speed avoidance range and the electromagnetic torque stays at the second electromagnetic torque before passing through the rotational speed avoidance range from a high rotational speed to a low rotational speed,
wherein the rotational speed avoidance range is an open interval.

19. The wind turbine according to claim 18, wherein adjusting the rotational speed avoidance control parameter of the wind turbine based on the statistical information about the rotational speed being in the rotational speed avoidance range comprises:
increasing the waiting time for jump-up and the waiting time for jump-down, and/or, increasing the first electromagnetic torque and decreasing the second electromagnetic torque, based on the statistical information about the rotational speed being in the rotational speed avoidance range.

20. A computer-readable storage medium storing computer programs thereon, wherein the computer programs, when being executed by a processor, perform:
identifying whether a rotational speed avoidance range is repeatedly passed through for a wind turbine based on statistical information about a rotational speed of a generator being in the rotational speed avoidance range; and
adjusting a rotational speed avoidance control parameter of the wind turbine based on the statistical information about the rotational speed being in the rotational speed avoidance range, in response to determining that the rotational speed avoidance range is repeatedly passed through for the wind turbine, wherein the statistical information about the rotational speed of the generator being in the rotational speed avoidance range comprises: a statistical duration in which the rotational speed of the generator is in the rotational speed avoidance range.

* * * * *